United States Patent [19]

Sawyer et al.

[11] 4,437,155
[45] Mar. 13, 1984

[54] CACHE/DISK SUBSYSTEM WITH DUAL AGING OF CACHE ENTRIES

[75] Inventors: Daniel D. Sawyer, Roseville; Marvin J. Thompson, Anoka, both of Minn.

[73] Assignee: Sperry Corporation, New York, N.Y.

[21] Appl. No.: 207,059

[22] Filed: Nov. 14, 1980

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,588,829 | 6/1971 | Boland et al. | 364/200 |
| 3,958,228 | 5/1976 | Coombes et al. | 364/200 |
| 4,156,906 | 5/1979 | Ryan | 364/200 |
| 4,161,024 | 7/1979 | Joyce et al. | 364/200 |
| 4,168,541 | 9/1979 | Dekarske | 364/230 |
| 4,181,937 | 1/1980 | Hattori et al. | 364/200 |
| 4,268,907 | 5/1981 | Porter et al. | 364/200 |
| 4,332,795 | 3/1982 | Lange et al. | 364/200 |

*Primary Examiner*—Jerry Smith
*Assistant Examiner*—Mark P. Watson

*Attorney, Agent, or Firm*—Griffin, Branigan & Butler

[57] ABSTRACT

When a processor issues a read or write command to read one or more words from a disk, a cache store is checked to see if a copy of the segment(s) containing the word(s) are present therein. If a copy of the segment is not present in the cache store then it is moved from disk to the cache store and sent to the processor. A segment descriptor table is maintained and the entries in the table are linked by forward and backward age links. When a segment is brought into the cache store from a disk because it contains the word or words specified by a command, its segment descriptor is linked in the age chain as the most recently used. Provision is made for reading into the cache store one or more segments in addition to the segment(s) containing the word(s) specified by a command, on speculation that the additional segment(s) contain words most likely to be accessed soon by the processor. The segment descriptor for these additional segments are linked into the age chain at an age which is intermediate the most recently used and the least recently used.

8 Claims, 1 Drawing Figure

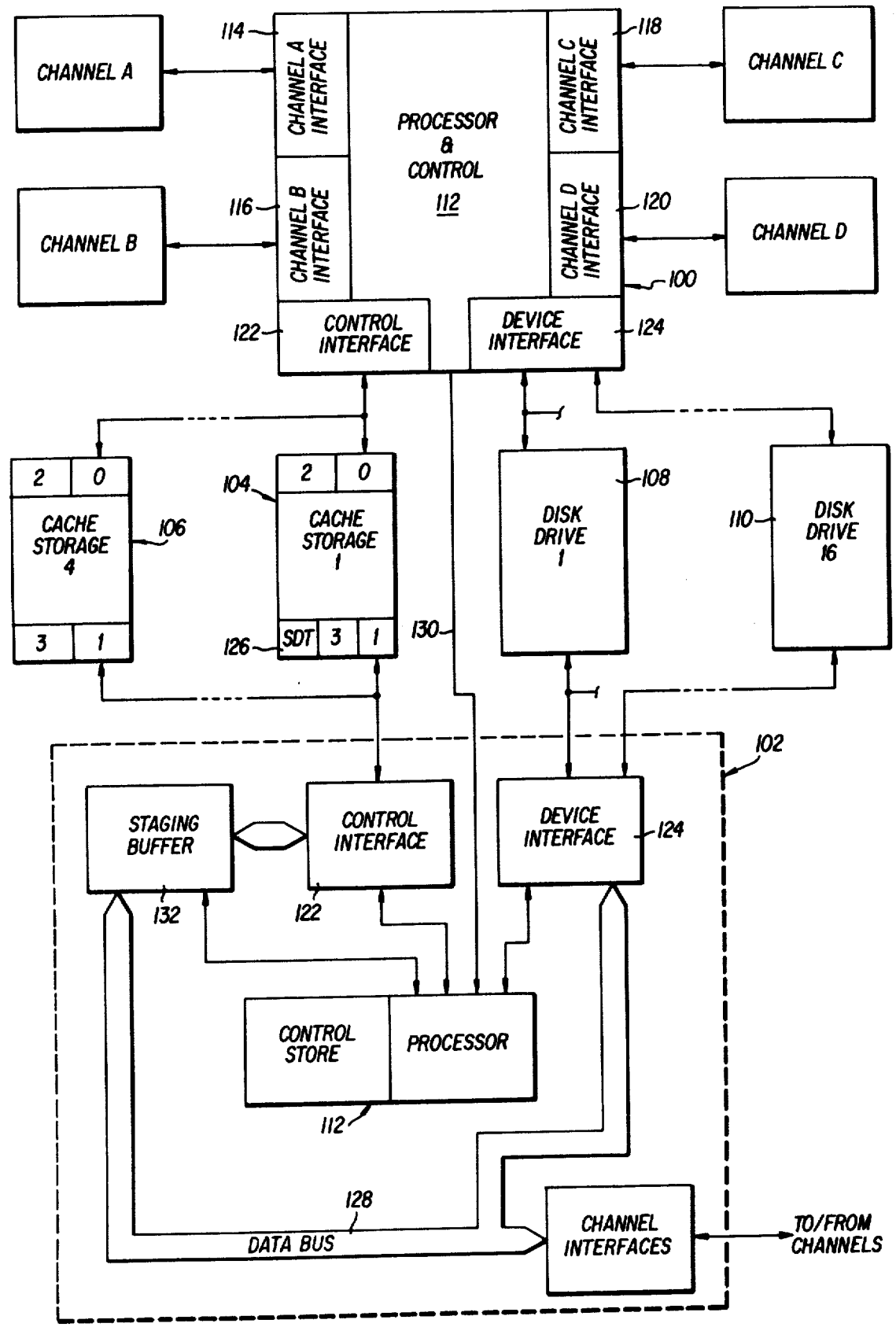

CACHE/DISK SUBSYSTEM WITH DUAL AGING OF CACHE ENTRIES

RELATED APPLICATIONS

This application incorporates by reference the concurrently filed applications of Robert E. Swenson Ser. Nos. 207,097 and 207,152, now U.S. Pat. Nos. 4,394,732 and 4,394,733, respectively, said applications being assigned to the same assignee as the present application.

BACKGROUND OF THE INVENTION

The present invention relates to a memory subsystem including a mass memory (disks) and a cache store for storing segments of data, and more particularly to a method and apparatus where different ages are assigned to segments of data depending on whether the segments are brought into the cache store because they were accessed by a host processor, or are brought into the cache store on speculation that they contain data which may be soon accessed by the host processor.

Swenson Pat. No. 4,394,733 discloses a cache/disk subsystem wherein a host processor issues a command to a storage control unit in order to read one or more data words from, or write one or more data words to a disk memory. Data is formatted on the disks by segments and a cache store is provided for storing copies of segments of data which have been recently accessed by the processor, or are likely to be soon accessed by the processor. When the processor issues a command, the storage control unit checks to see if the segment or segments containing the desired data word or words is/are present in the cache store and, if so, a data transfer takes place between the cache store and the processor. If the segment is modified, i.e. a write command is executed, then the modified segment is copied back to a disk at some later time as described in U.S. Pat. No. 4,394,732.

If a copy of the data word or words specified by a processor command are not resident in the cache store then the storage control unit transfers the segment or segments of data containing these words from a disk to the cache store and the processor (for a read command) or transfers the segments to the storage control unit where they are modified by the data from the processor (a write command) before being written into the cache store.

A segment descriptor table is maintained which contains an entry corresponding to each segment of data in the cache store. Each segment descriptor contains information relating to its segment and each entry includes a forward and a backward age link. The age links comprise an age chain which links the segments from most recently used to least recently used. Each time a data segment is accessed in the cache store, its corresponding entry in the table is modified to make it the most recently used in the age chain. In like manner, when a segment of data is moved from a disk to the cache store because a command has specified access to a word or words in the segment, the segment descriptor table entry for that segment is modified to make it the most recently used in the age chain. When copying segments of data from the cache store to the disks, the least recently used segments are transferred first so that the most recently used segments remain resident in the cache store.

The system as described above exploits the hypothesis generally referred to as history of reference. This hypothesis states that if reference is made to location X, the probability of location X being referenced again is higher than the probability of location Y being referenced, where Y is a random location.

A further hypothesis, generally referred to as linearity of reference, holds that if reference is made to location X, the probability of location X+1 being referenced is higher than the probability of location Y being referenced, where Y is a random location. The prior art and U.S. Pat. No. 4,394,733 both operate in conformance with these hypotheses.

The present invention provides a method and means for optimizing both referencing patterns. When a command seeks to access data words from a segment not resident in the cache store, the segment containing the accessed data words is transferred to the cache store together with one or more additional or speculative segments. The speculative segments are so named because, in accordance with the linearity of reference hypothesis it is speculated or assumed that they will likely soon be accessed by a command. The segment containing the accessed data words is assigned a most recently used age in the age chain while the additional or speculative segments are assigned an age which is intermediate the most recently used age and the least recently used age. Therefore, if a particular reference pattern (i.e. sequence of processor commands) exhibits a linear characteristic then the additional segments are available in the cache store at the older age. If the reference pattern exhibits an historical characteristic then the additional segments will move toward the bottom of the age list (LRU) and will become available for replacement sooner than the referenced segments.

SUMMARY OF THE INVENTION

An object of the present invention is to provide a method and apparatus wherein referenced data segments are assigned a most recently used age as they are transferred from a mass memory to a cache store and additional segments transferred from said mass memory to said cache store with said referenced data segments are assigned an age intermediate a most recently used age and a least recently used age, where segments with the least recently used age are the first to be written from the cache store to the mass memory in order to make room for more segments in the cache store.

An object of the present invention is to provide a method and apparatus as described above wherein the number of additional segments read in with said referenced segments may be predetermined by a parameter loaded into the system at the time of system initialization.

In accordance with the principles of the present invention, a data processing system includes a host processor, a cache store, a mass memory, a segment descriptor store and a storage control unit for transferring data between the cache store, the mass memory and the host processor. The segment descriptor store stores a table of segment descriptors, one for each segment of data resident in the cache store. Each segment descriptor includes a backward age link which links or chains the associated segments from the most recently used to the least recently used and a forward age link which links the segments from the least recently used to the most recently used. When the host processor issues a command and a copy of the data specified by the command is not resident in the cache store, the segment or segments containing the specified data is/are transferred to the cache store. As each of these segments is entered into the cache store the forward and backward age links in the segment descriptor store are updated to make the segment the most recently used in the age chain. Additional segments, other than the segment or segments containing the specified data are also transferred from the mass memory to the cache store. As each of these additional segments is entered into the cache store the age links in the segment descriptor store are updated to give the segment an age which is intermediate the most recently used and least recently used age, this intermediate age being specified by a parameter loaded at the time of system initialization.

Other objects of the invention and its mode of operation will become apparent upon consideration of the following description and the accompanying drawing.

BRIEF DESCRIPTION OF THE DRAWING

The single FIGURE is a block diagram of a cache/-disk subsystem suitable for use in practicing the present invention.

DETAILED DESCRIPTION OF THE INVENTION

The drawing shows a cache/disk subsystem comprising first and second storage control units 100,102, a cache store comprising one or more cache storage units 104,106, a bulk memory comprising a plurality of disk drives 108,110 for driving storage disks, and a plurality of channel units A–D for connecting the storage control units to one or more host processors (not shown).

As illustrated in storage control unit 102, each storage control unit includes a processor and control store 112, a staging buffer 132 and interface circuits for interfacing with the disk drive devices and the channel units.

As explained in detail in application Ser. No. 207,152, now U.S. Pat. No. 4,394,733, a host processor issues commands through a channel unit to the storage control unit when the host processor wishes to read data from, or transfer data to, one of the disk drive devices. A command issued by the host processor defines the operation to be performed and specifies the starting address of as well as the length (number of words) of the disk space at which the operation is to be performed. The length may span one or more segments and may begin or end at any word in a segment.

Data in the cache store and on the disks is managed by segments. The cache store stores copies of segments of data which have recently been read from the disks to a host processor or sent to the storage control unit by a host processor for writing onto the disks. A segment descriptor table 126 has an entry therein for each segment of data in the cache store and by utilizing the segment descriptor table a storage control unit may determine whether or not a copy of the data from the disk space specified by a host processor command is resident in the cache store.

When a host processor issues a Normal Read or Normal Write command to a storage control unit, the storage control unit checks the segment descriptor table to see if a copy of the data from the disk space specified by the command is resident in the cache store. If it is, the storage control unit controls the transfer of the data between the cache store and the host processor.

If a command is a Normal Read command and a copy of the data from one or more segments of the disk space specified by the command is not resident in the cache store, the data is read form the disk to staging buffer 132 and then to the host processor via data bus 128 and a channel interface. If a copy of the data from one or more segments of the specified disk space is resident in the cache store then these segments are transferred to the host processor through the staging buffer instead of the corresponding segment of data from the disk. Copies of all segments of data transferred to the host processor are entered into the cache store.

If the command is a Normal Write command, the data from the host is written into the cache store. If the specified transfer does not begin on a segment boundary the first segment of data is read from the disk if it is not resident in the cache store, or read from the cache store if it is resident therein. The segment is overwritten in the staging buffer with the data from the host processor and the result returned to the cache store. The last segment is treated in the same manner as the first segment.

In the write operations described above, the data is not written to the disk under the control of the processor which issued the command. The storage control unit controls the subsequent transfer of "written-to" segments from the cache store to the disks at a time which is more convenient for the storage control unit. This operation is described in U.S. Pat. No. 4,394,732.

When one or more segments are transferred from disk space to the cache store in order to provide data specified by a processor command, additional segments of data are also transferred on speculation that they may soon be accessed by a processor command. The Read/-Write routine illustrated in FIGS. 73A–73E of U.S. Pat. No. 4,394,733 controls the transfer of data segments from the disks to the cache store. In FIG. 73A, a loop is executed for each segment to be transferred. The SDT is searched and if a data segment is already resident in the cache store (a hit) the segment descriptor age links are adjusted to make the segment the most recently used. If a segment is not resident in the cache store (a miss) a segment descriptor is formed for the segment and the age links are adjusted to make the segment the most recently used.

In FIG. 73B, the count of the number of empty segments in the cache store (SBGMTS) is checked. If SBGMTS is not zero then there is space available to transfer one or more speculative segments to the cache store. The routine branches to FIG. 73E where the number of segments to be transferred (NSEG) is subtracted from the number of segments, including speculative segments, that should normally be transferred from the disks to the cache store (NSRI). If NSRI is greater than NSEG then the difference (NRI) represents the number of speculative segments which may be transferred. An SDT entry is formed for each of the speculative segments. The speculative SDT entries are formed in much the same way as the normal SDT entries. The primary difference is that the Make Age ASRI subroutine (FIGS. 81A–81C) is called to adjust the age links in the SDT so that each speculative segment will be linked into the age links at an age which is at some value intermediate the most recently used and least recently used age. The age at which an entry is linked is predetermined by a parameter ASRI which is loaded into the system at the time the system is initialized or parameterized.

The embodiments of the invention in which an exclusive property or privilege is claimed are defined as follows:

1. In a data processing system including a host processor for issuing addressing signals specifying data to be accessed, a mass memory, a cache store for storing segments, and a segment descriptor table for storing segment descriptors, there being a segment descriptor associated with each data segment in said cache store and including age information defining, from the most recently accessed to the least recently accessed, the relative lengths of time since each associated data segment has been accessed, the system including means for transferring to said mass memory the least recently accessed segments in said cache store in order to make room for more data segments, the improvement comprising:

means connected to said host processor, said mass memory and said cache store for transferring from said mass memory to said cache store not only a data segment containing data specified by said addressing signals but not resident in said store, but also a number of additional segments; and, age modifying means for modifying said age information in said segment descriptors each time data segments are transferred from said mass memory to said cache store to produce modified age information, said modified age information indicating that the data segment containing the data specified by said addressing signals is the most recently accessed data segment, and indicating that said number of additional segments have an age intermediate the most recently accessed and the least recently accessed.

2. The improvement as claimed in claim 1, wherein said age modifying means includes means for storing a value representing the modified age to be assigned to each of said additional segments as said additional segments are transferred from said mass memory to said cache store.

3. The improvement as claimed in claim 1 and further comprising:

means for storing a first value representing a maximum number of segments of data which may be transferred between said mass memory and said cache store;

means for computing a second value representing the number of segments to be transferred from said mass memory to said cache store which contain data specified by said host processor; and, difference determining means for determining the difference between said first value and said second value, said means for transferring data segments from said mass memory to said cache store being responsive to said difference determining means for transferring a number of said additional segments which is equal to said difference.

4. The improvement as claimed in claim 1 wherein said data segments each comprise a plurality of data words.

5. In a data processing system having a host processor, a mass memory for storing segments of data, a cache store for storing copies of segments of data which have been read from, or are to be written to said mass memory, and a store for storing a table of segment descriptors, there being a segment descriptor in said table corresponding to each segment of data resident in said cache store and each of said segment descriptors including a backward age link field and a forward age link field, said age link fields linking said segment descriptors to thereby define an age chain for the segments of data corresponding to said segment descriptors, said backward age link fields defining links in an age chain extending from the most recently accessed data segment in said cache store to the least recently accessed data segment in said cache store and said forward age link fields defining links in an age chain extending from the least recently accessed data segment in said cache store to the most recently accessed data segment in said cache store, a method of assigning ages in said age chain to data segments transferred from said mass memory to said cache store, said method comprising:

assigning to each data segment transferred from said mass memory to said cache store a most recently accessed age if said transfer is made to satisfy a host processor command for access to data in the segment; and, assigning to each data segment transferred from said mass memory to said cache store an age which is intermediate said most recently and least recently accessed ages if the transfer is not made to satisfy a host processor command for access to data in the segment.

6. In a system having a host processor, a cache store for storing segments of data, means for linking said segments of data in an age chain according to the relative times at which they were last accessed, a mass memory and means for transferring to said cache store from said mass memory not only segments of data to which access has been required by said host processor but also a number of additional segments to which access has not been required by said host processor, said system being operative to transfer the least recently accessed data segments in said cache store to said mass memory to make room for data segments transferred to said cache store, the method of controlling the aging of segments in said cache store comprising:

assigning to a given segment transferred to said cache store from said mass memory a most recently accessed age if said given segment is transferred because access thereto has been required by said host processor;

assigning to a given segment transferred to said cache store from said mass memory an intermediate age which is intermediate the most recently and least recently accessed ages in said age chain if said given segment is not transferred because access thereto has been required by said host processor.

7. The method as claimed in claim 6 wherein said means for linking said segments of data in an age chain comprises means for storing a segment descriptor table having therein a segment descriptor corresponding to each data segment resident in said cache store, each segment descriptor including a backward age link field pointing to the segment descriptor for the next least recently accessed data segment in the cache store and a forward age link field pointing to the next most recently accessed data segment in said cache store, said step of assigning an age which is intermediate the most recently and least recently accessed ages comprising adjusting the age links in said chain so as to link the formed segment descriptor in said age chain as the next most recently accessed relative to the last segment descriptor assigned said intermediate age.

8. The improvement as claimed in claim 7 wherein said step of assigning an age which is intermediate the most recently and least recently accessed ages comprises adjusting the age links in the segment descriptors for the next most recently accessed and next least recently accessed data segments, relative to the data segment being assigned said intermediate age, whereby an age field in the segment descriptor for said next most recently accessed and next least recently accessed data segments point to each other and they are adjacent entries in said age chain.

* * * * *